United States Patent [19]

Andorf et al.

[11] Patent Number: 4,661,396
[45] Date of Patent: Apr. 28, 1987

[54] ARTICLE OF INTEGRALLY-MERGED HARD AND SOFT POLYVINYL CHLORIDE

[75] Inventors: Paul Andorf, Wettstetten; Hans Jäger, Weinheim, both of Fed. Rep. of Germany

[73] Assignee: Firma Carl Freudenberg, Weinheim/Bergstr, Fed. Rep. of Germany

[21] Appl. No.: 784,363

[22] Filed: Oct. 4, 1985

[30] Foreign Application Priority Data

Oct. 30, 1984 [DE] Fed. Rep. of Germany ....... 3439670

[51] Int. Cl.⁴ .......................... B32B 7/02; B32B 7/04
[52] U.S. Cl. ................... 428/217; 156/272.2;
428/36; 428/159; 428/161; 428/163; 428/318.6;
428/319.3
[58] Field of Search ...................... 428/158, 159, 309.9,
428/319.3, 319.7, 318.6, 36, 161, 163; 156/272.2

[56] References Cited

U.S. PATENT DOCUMENTS 4,278,728  7/1981  Honda et al. ................... 428/318.6

FOREIGN PATENT DOCUMENTS 2844014  4/1980  Fed. Rep. of Germany ... 428/318.6
140437   3/1980  German Democratic Rep. ............................... 428/319.7
6104037  8/1981  Japan ................................... 428/158

Primary Examiner—William J. Van Balen
Attorney, Agent, or Firm—Felfe & Lynch

[57] ABSTRACT

An article has a wall with a first, continuous region and a second, smaller region on the first region and integrally mereged with the first region thereat, both wall regions being made of PVC materials for so integrally merging by the common PVC constituent thereof in the process of forming the regions one on the other. The second wall region is preferably made harder by irradiation crosslinking after forming the regions.

3 Claims, 4 Drawing Figures

ARTICLE OF INTEGRALLY-MERGED HARD AND SOFT POLYVINYL CHLORIDE

BACKGROUND OF THE INVENTION

The invention relates to an article of integrally-merged, hard and soft polyvinyl chloride (hereinafter PVC) and, more particularly, an article having a wall with a first, continuous region of PVC of lower hardness than at least one, second, smaller region of PVC of greater hardness than the first region integrally merged therewith.

German utility model patent publication No. 77 16 857 describes an air-intake tube for the internal-combustion engine of a motor vehicle which has axially-successive wall regions of alternately greater and lower hardness. This results in good shape stability and isolation of the vibrations produced by the motor. Fabrication requires manually cementing together ring moldings for the succeeding regions, however, which is not easily acceptable economically. The vibrations during use can, further, combine with the vacuum in the interior of the tube during use to break fragments out of the harder wall regions which can seriously damage the engine. Such damage has been repeatedly observed in overhauling motor vehicles equipped with such air-intake tubes.

SUMMARY OF THE INVENTION

It is, therefore, an object of the invention to improve the air-intake tube described above and other articles such that the described difficulties of production and use are avoided.

To this and other ends, the invention is an article having a wall with a first, continuous region of a PVC material and at least one, second, smaller region of a PVC material of greater hardness than that of the first region, the second, smaller region of PVC material being on the first region, whereby the PVC material of the second region is piled up sectionally on the PVC material of the first region, and integrally merged with the first integrally merged with the PVC material of the first region where thereon. The PVC materials may have other constituents such as fillers, for example, in addition to sufficient PVC for the functions and properties described.

Because the first wall region is continuous, it determines the basic shape of the wall of the article and, in the case of a tube like the previously-described air-intake tube which is a preferred embodiment of the invention, for example, the shape of the article. Its continuity also provides other properties to the wall and article such as gas tightness, flexibility, and appearance, for example.

Because the second wall region is smaller and harder than the first, it is positioned where reinforcement is desired. The harder sections can be shaped in dependence on the required firmness properties of the molded article. In the preferred, air-intake tube embodiment, for example, the reinforcement of multiple second regions in the form of successive rings spaced along the tube controls flexure, limiting it primarily to unreinforced locations, for example, and shape stabililty.

Because the second region is integrally merged with the first region, too, the regions are in mutual reinforcement so that the regions will not separate. As a result, the second wall regions can be on the inside surface of the first wall region of the preferred air-intake tube embodiment without risk of separation even if fragmented by the vibrations and under the vacuum of use.

Because PVC is used for the materials of both wall regions, the PVC materials for the regions can be selected and processed in known ways to merge integrally when the regions are put together, one on the other, and shaped into the wall of the article by dipping, for example. Particular and preferred ease of production is achieved by further selecting a known PVC material for the second wall region which can be chemically crosslinked for hardness, after being put together with that of the first region and shaped, by irradiation with at least one energy-rich beam such as an electron beam, for example, and selecting a known PVC material for the first wall region which so crosslinks less or not at all to establish the relative hardnesses of the regions. The relative hardnesses of the regions then depends on the materials used for the regions and on the type and intensity of the irradiating beam.

Especially-good, after-merging, relative hardening of the second region by the irradiation can be achieved if from about 5 to about 70 weight-percent of at least one substance that can be crosslinked or polymerized by ionizing radiation is uniformly incorporated into the PVC material for the second region and the irradiation provides such ionizing radiation. Such a substance can be one of low molecular weight and capable of one or more double bonds, for example, such as acrylates, methacrylates or esters of allyl alcohol, more particularly. These can be incorporated into the PVC material for the second region with the necessary uniform distribution and in the necessary amount either during the preparation of the material or by subsequent compounding therewith. Both the kind and amount of the crosslinking substance added and the energy input of the subsequent irradiation then control the hardness of the material of the second region. The combination to be used in each case can be determined with the necessary accuracy by not-undue preliminary experiment well within the skill in the art.

The ionizing radiation for this can be of different kinds. In many cases, highly-energetic radiation such as gamma or X-ray radiation will be preferred because it is capable of penetrating even a thick wall of the PVC materials on a large article, for example, without substantial weakening by any fillers that may be present in the materials and, thus, is capable of modifying the relative hardnesses, as desired. For articles of lesser wall thickness, however, electron beam irradiation is preferred because it involves fewer hazards and, therefore, is cheaper.

In addition to the dipping process previously indicated, it is also possible to produce the wall regions by molding. For example, the first wall region may be advantageously molded from a foamable composition of PVC material by a process known for this and blown or foam-expand by, for example, heating after application of the second wall region. The formation of a uniform, continuous skin at least on exposed surfaces of the first wall region is also easily accomplished in this process in known ways. The known dipping process, however, produces the PVC wall regions at especially low cost and the resulting wall regions are characterized by good stability of shape and by at least substantially-complete freedom from fragmentation. It is, therefore, preferred for producing an air intake tube.

BRIEF DESCRIPTION OF THE DRAWINGS

Preferred embodiments which illustrate but do not limit the invention will now be described with reference to drawings, in which.

DESCRIPTION OF PREFERRED EMBODIMENTS

Figure 1:
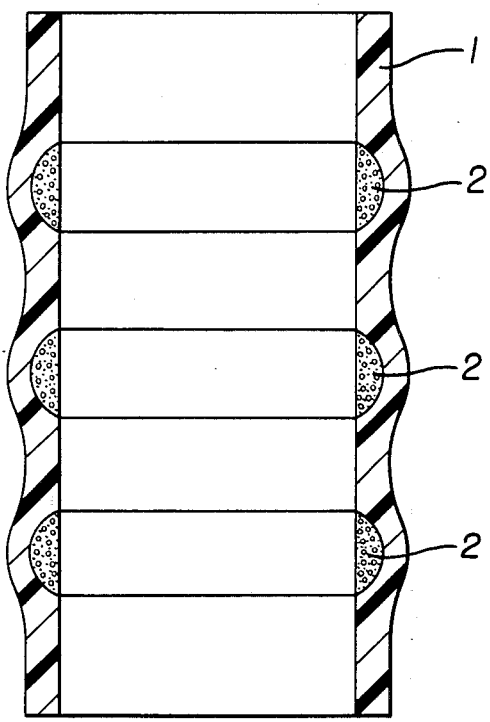
FIG. 1 is a sectional elevation of one preferred embodiment.

The merely-exemplary, preferred embodiment of FIG. 1 is a tubular article, for example an air-intake tube, having, in accordance with the invention, a wall with a continuous first region 1 of tubular shape which, in this case, therefore, also substantially determines the shape of the article. The tubular first wall region is reinforced on its inside surface at intervals by therefore necessarily-smaller, second wall regions 2 of annular shape which are harder than the first wall region and, therefore, shown in FIG. 1 as a hard material even though their hardness is only relative to the first wall region. Each wall region is, in fact, a PVC material. The tubular article is, therefore, very flexible but, particularly because of the reinforcing, harder second wall regions, has a good stability against collapse by a vacuum therein.

The first and second wall regions are integrally merged where they contact each other. This is easily accomplished by the processes described below, for example, because each wall region is a PVC material which, therefore, can merge with the like PVC constituent of PVC material of the other region.

The inside surfaces of the tube-shaped first wall region and annular second wall regions thereon are also substantially flush. Shaping for this can be accomplished as part of the processes of applying and merging the wall regions onto each other as described below. As a result there are no undesirable, material-catching, flow-blocking, or fragmentation-prone projections on the inside of the tube.

Figure 2:
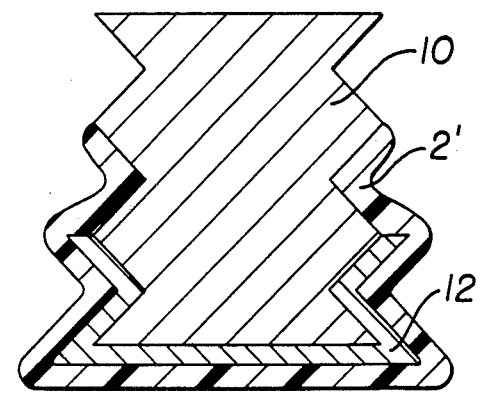
FIG. 2 is a sectional elevation of a first step in a process of making another preferred embodiment.

Another, pleated-bellows embodiment of the invention will now be described in conjunction with the process of its manufacture and FIGS. 2 and 3. The production process has three, basic, successive steps.

In the first step, the middle part of the bellows which is later to form the second, harder region 2' of the bellows article wall is produced by dipping. For this, a rotationally-symmetric, cylindric, for example, core 10 of bellows-like appearance is suspended (not shown) at one end, the top as shown, for movement axially of its rotational symmetry and surrounded at the other end, the bottom as shown, by a cuff 12 which extends axially of the core about one-third the length of the core.

The core is moved axially by its suspension to immerse it, cuff end first, in a paste PVC material for the second region 2' such that about one-third of its axial length is above the surface of the PVC material. No coating of PVC material is, therefore, formed on this top one-third of the core during the first immersion. In addition, the cuff 12 prevents the other bottom end of the core from being coated with the PVC material of the first immersion step. The core coating for the second region 2' formed by the first immersion is thus limited to the middle part of the core as shown in FIG. 2.

The PVC material used for the first immersion is preferably a mixture of the following composition:

| PVC[1] | 100 weight-parts |
|---|---|
| Plasticizer[2] | 40 weight-parts |
| Trimethylolpropane trimethacrylate[3] | 60 weight-parts |
| Stabilizer[4] | 2 weight-parts |
| Pigments | 1 weight-parts |

The parenthetical numbers refer to the following notes:
[1] Commercial types of PVC pastes.
[2] Plasticizers suitable for the preparation of soft PVC mixtures, e.g., dioctyl phthalate, dioctyl adipate, benzyl butyl phthalate, dibutyl phthalate, dinonyl phthalate, didecyl phthalate, tricresyl phosphate, polymeric plasticizers, etc.
[3] Instead of trimethylolpropane trimethacrylate, other substances containing one or more double bonds and polymerizable by ionizing irradiation such as acrylates, methacrylates, esters of allyl alcohol, etc., for example, or mixtures of any of these substances, can be used.
[4] Commercial organic compounds containing stabilizers such as Ba, Cd, Zn, Pb, Ca, K, Sn, etc., or metal-free organic stabilizer
N.B.: Small amounts of inhibitors (radical interceptors), e.g., mixtures of alkylated and aralkylated phenols, can also be added to the mixture for preventing premature hardening due to partial crosslinking while gelling the wall regions 1',2' as later described to avoid stripping problems in removing them from the core. Such additives do not markedly interfere with the radiation crosslinking later described.

The core 10 is coated with the above-described mixture only in the middle portion for the second wall region 2' is then lifted out of the PVC material paste and the cuff 12 taken from its bottom end. The core 10 and PVC material for the second wall region 2' are then immediately immersed to the top of the core in a second PVC material.

The second PVC material is a mixture of the following composition:

| PVC[1] | 100 weight-parts |
|---|---|
| Plasticizer[2] | 100 weight-parts |
| Stabilizer[4] | 2 weight-parts |
| Pigments | 1 weight-parts |

The parenthetical numbers refer to the preceding notes.

Figure 3:
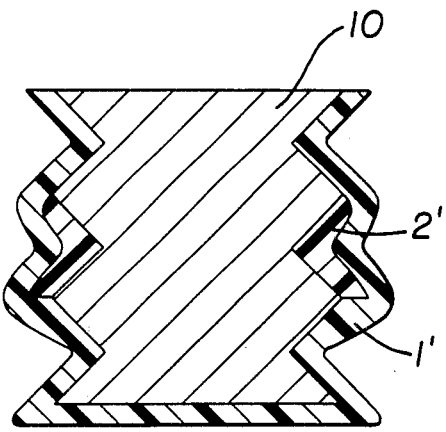
FIG. 3 is a sectional elevation of a second step in a process of making the preferred embodiment of FIG. 2.

Upon removal, the core 10 and PVC material for the second wall region at the middle of the core are covered with a continuous coating of the second PVC material for the first wall region 1' as shown in FIG. 3. The coated core is then heated in an oven for 20 minutes at 180° C., thereby gelling the PVC coatings for the first and second wall regions 1',2'.

After cooling, e.g., by immersion in a bath of water, the bellows article of wall regions 1',2' is stripped from the core 10 via their open top, the PVC materials having sufficient elasticity for this. The resulting bellows article (not shown) has, on the middle of its inside, the PVC material of the first immersion step for the second wall region 2' and, elsewhere, the PVC material of the second immersion step as the continuous, larger, first region 1'. The materials of both regions merge integrally with one another where they contact one on the other because of the dipping process and common PVC constituent of the paste materials thereof. The bellows article is also distinguished by a completely smooth surface, on the inside, because of the core and, on the outside, because dipped.

In the third step (not shown), the bellows article which, as now removed from the core 10 and gelled, is constituted only by the first wall region 1' and the first material for the second region 2' is then exposed to the action of an ionizing radiation for hardening the first PVC material into the second wall region 2'. For this, electron radiation of 3 megavolts is aimed at the surface of the bellows simultaneously from three different sides for more uniform exposure. Irradiation from only one side would call for continuous rotation of the bellows during the irradiation for uniform exposure and is, therefore, not preferred even though this, too, would result in a uniform modification of the hardness of the second wall region 2'. The duration of the irradiation of the bellows is such that a specific surface does of 40 to 60 KJ/kg results.

After such irradiation, the second wall region 2' has a Shore A hardness of approximately 98. The continuous, first wall region 1', however, is virtually unaltered in hardness and has a Shore A hardness of 56. The Shore A hardnesses are measured in each case in accordance with German Industrial Standard (DIN) No. 53505. The bellows can thus be expanded in its end areas of only first wall region 1' to facilitate installation and use while the reinforcement of the middle portion by the second wall region 2' yields good shape stability in use and under vacuum. Nevertheless, there is no need to fear that, after a powerful deformation, fragments of the second, reinforcing, harder wall region 2' might separate from the inside of the bellows and get into a flow system connected to the bellows in use for several reasons.

Fragmentation of the second, harder wall region by a blow on the outside of the bellows is made difficult by the layer of soft-elastic padding of the material of the first wall region 1' covering the second wall region 2'. In this regard, the first wall region 1' provides for a certain absorption of such blows. The effects of such a blow are, therefore, greatly mitigated. Further, the hardened, second wall region is integrally merged with the soft-elastic padding of the first wall region 1'. Even fragments of the second wall region 2' completely broken from the rest of the region in any way are, therefore, not easily detached from the soft-elastic, first wall region 1'. Instead, even though broken away, the fragments will remain in their original position.

Figure 4:
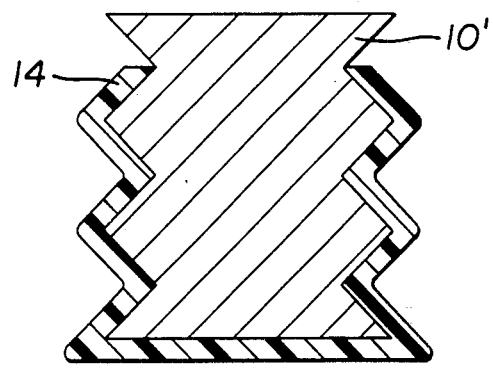
FIG. 4 is a sectional elevation of a first step in a process of making still another preferred embodiment.

Absolute safety from fragments can be achieved with another embodiment (not shown) in which the second harder wall region is integrally merged on all sides inside the soft-elastic first wall region. The general process of producing this embodiment can be as described above if, prior to the first step previously described for applying the PVC material for the second wall region 2', the core 10' is provided by dipping, for example, with a coat 14 as shown in FIG. 4 of slow-gelling PVC paste not hardened by the irradiation. This, therefore, will be on the inside of the finished bellows article after then following the above-described steps. This paste can have the following composition:

| | |
|---|---|
| PVC[1] | 100 weight-parts |
| Plasticizers[5] | 100 weight-parts |
| Stabilizers[4] | 2 weight-parts |
| Pigments | 1 weight-parts |

The parenthetical numbers again refer to the above notes and the following note:
[5] Slowly gelling plasticizers, such as dioctyl adipate or didecyl adipate.

It will be understood that the specification and examples are illustrative but not limitative of the present invention and that other embodiments within the spirit and scope of the invention will suggest themselves to those skilled in the art.

What is claimed is:

1. An article, comprising:
   a wall having a first, continuous region of a PVC material and at least one, second, smaller region of a PVC material cross linked for greater hardness than the PVC material of the first region, the PVC material of the second, smaller region being on the first region, whereby the PVC material of the second region is piled up sectionally on the PVC material of the first region, and integrally merged with the PVC material of first region where thereupon.

2. The article of claim 1, wherein the PVC material of the first region is foamed.

3. An article having a wall made by the process comprising the steps of:
   forming a first, continuous region of the wall and at least one, second, smaller region on the first region of PVC materials which integrally merge with each other in the step of forming the regions on each other where the regions are on each other, the PVC material for the second region being more crosslinkable by irradiation than that for the first region for greater hardness; and
   irradiating the PVC material for at least the second region for crosslinking and, thereby, hardening the same more than the PVC material for the first region.

* * * * *